Feb. 28, 1967  G. F. GOODMAN, JR  3,306,147
RUBBER SLAB CUTTER
Filed April 19, 1965  4 Sheets-Sheet 3
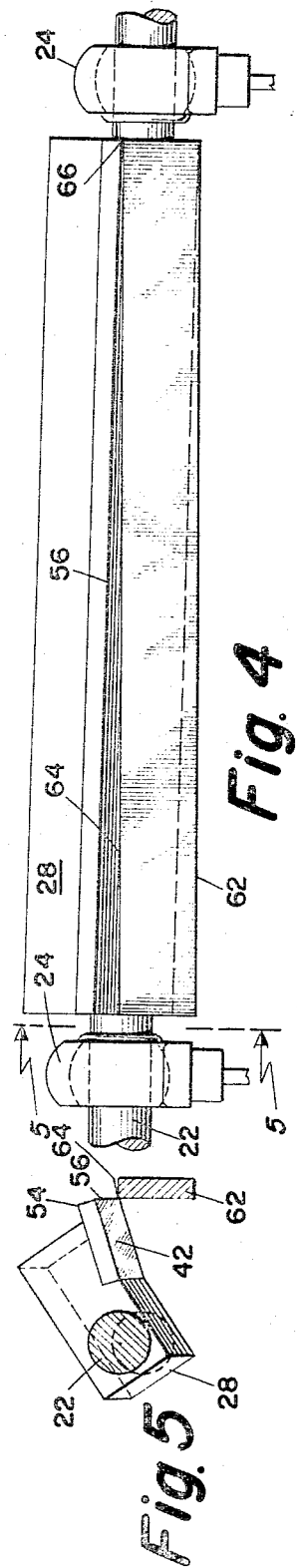
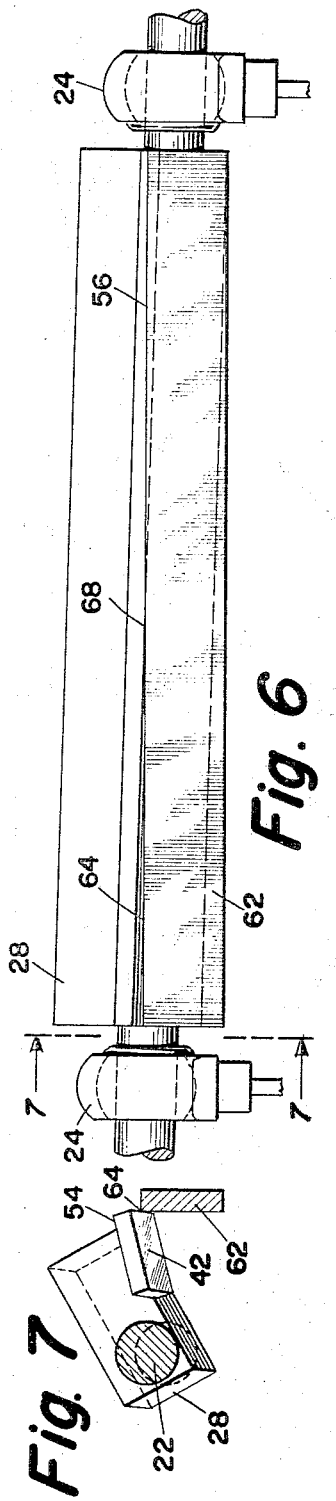
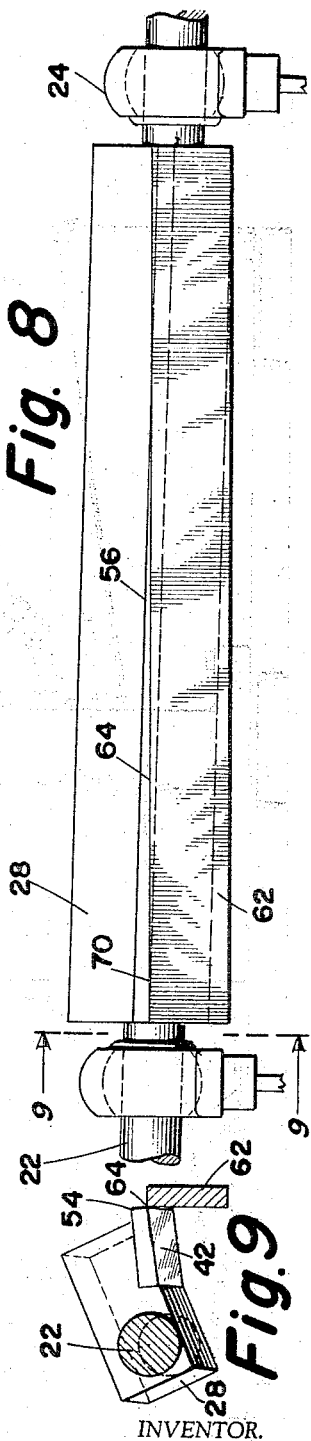
INVENTOR.
GEORGE F. GOODMAN, JR.
BY
Milman and Jacobs
ATTORNEYS

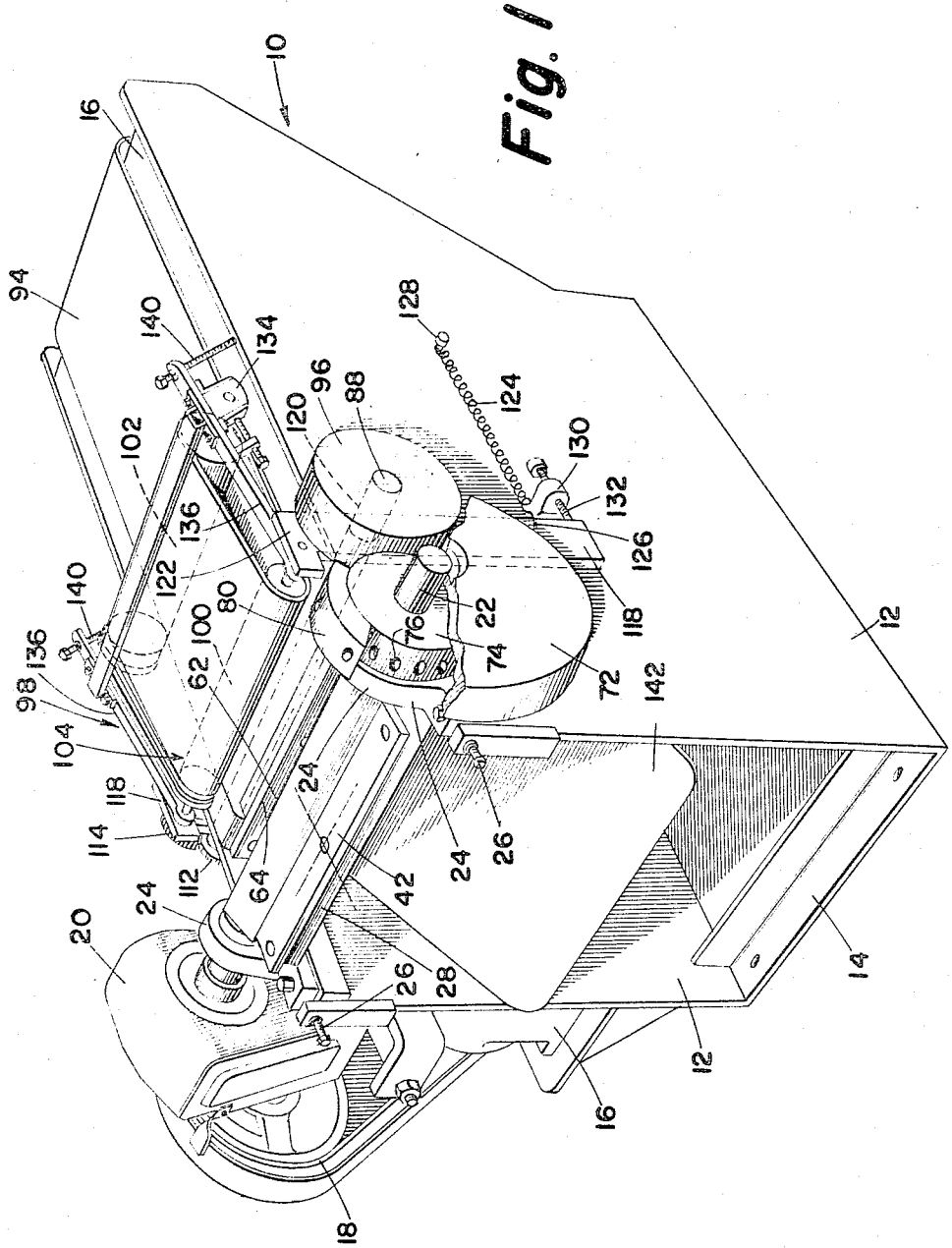

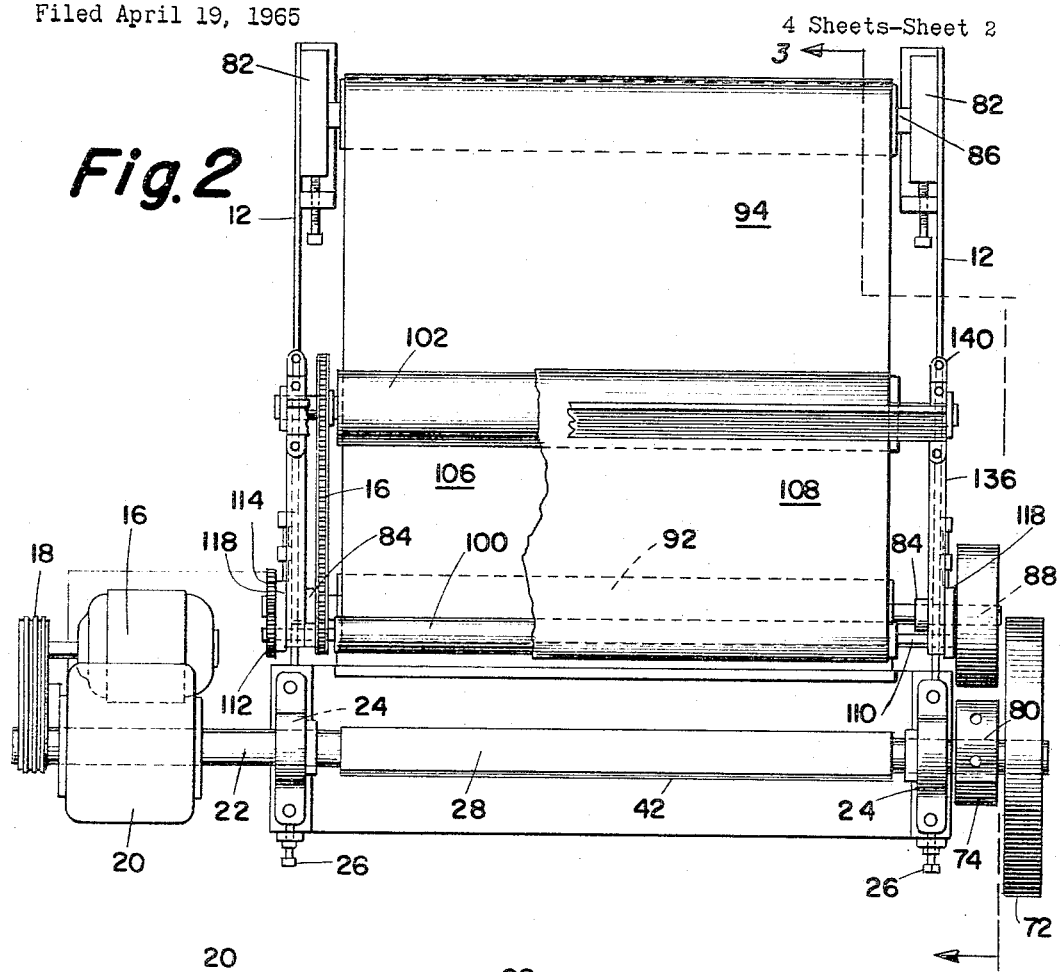
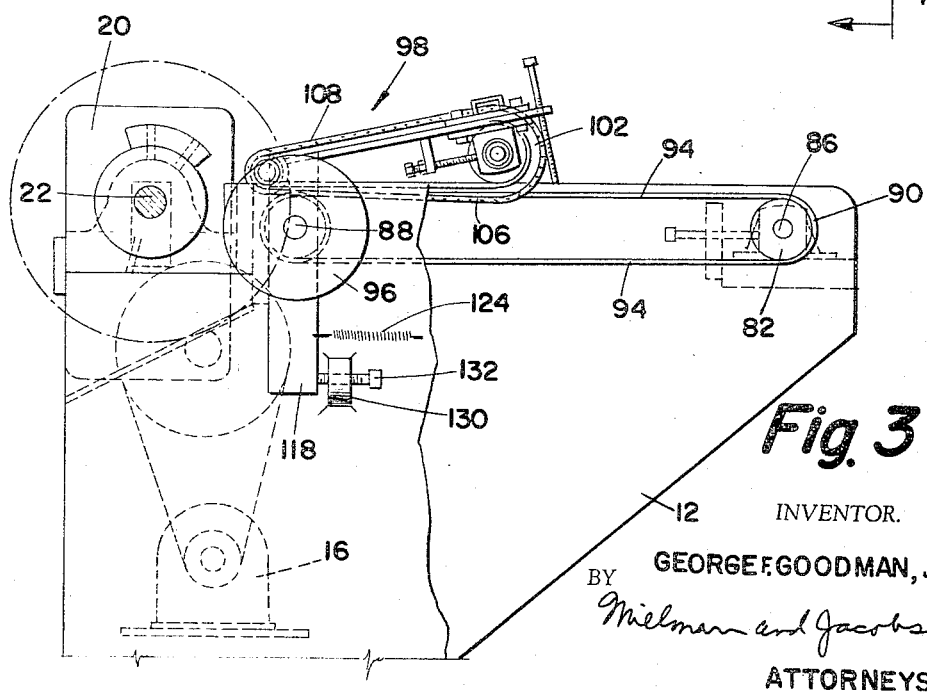

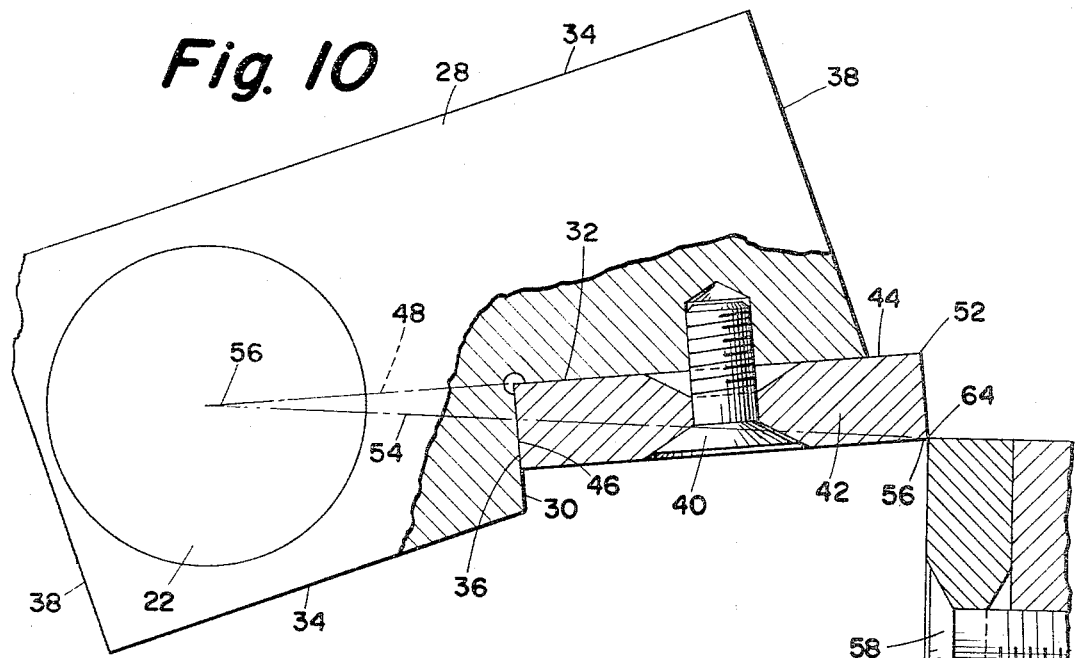
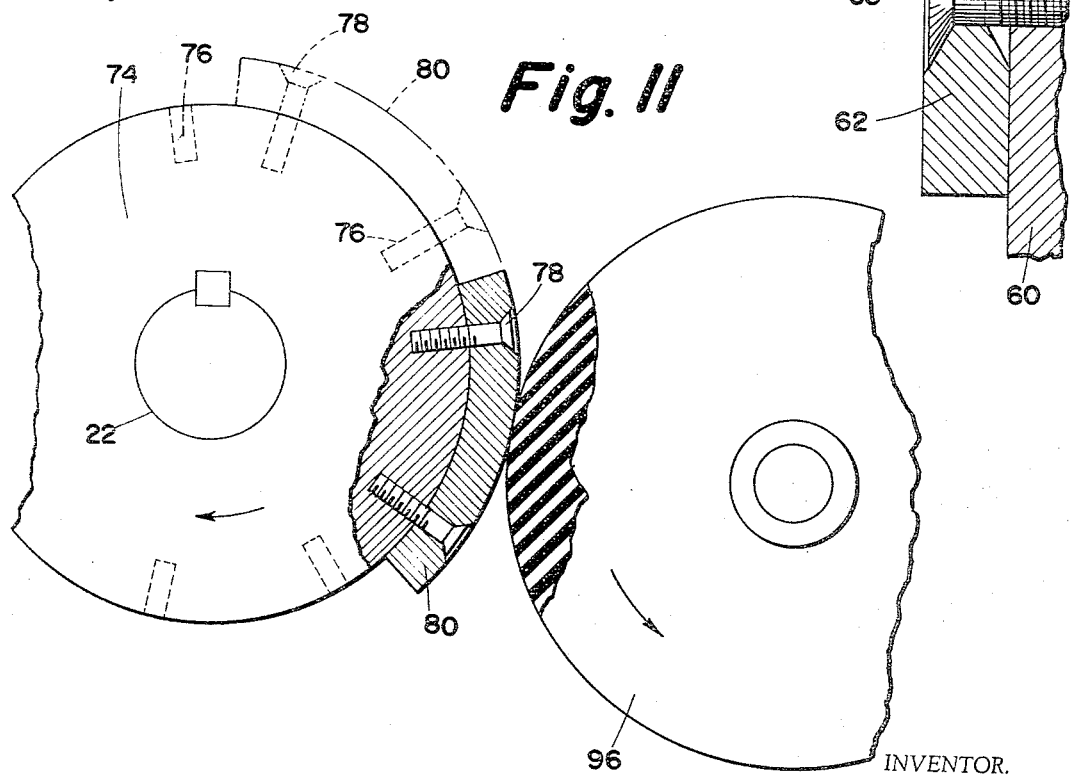

United States Patent Office 3,306,147
Patented Feb. 28, 1967

3,306,147
RUBBER SLAB CUTTER
George F. Goodman, Jr., 1060 Allengrove St.,
Philadelphia, Pa. 19124
Filed Apr. 19, 1965, Ser. No. 448,996
11 Claims. (Cl. 83—226)

This invention relates to a machine for cutting uncured milled rubber slabs into strips suitable for feeding an extruder.

The primary object of the invention is to provide a machine having means to feed the rubber slabs automatically and intermittently to and over the edge of a stationary blade where it is sheared by a rotary blade which is driven synchronously with the slab feed means.

Another object of the invention is to provide a cutter assembly of a stationary blade and a rotary blade so mounted relative to the stationary blade that efficient shearing can be effected without the need for beveled cutting edges. Thus, the blades in the instant machine are rectangular in cross section and removable for repositioning to provide four cutting edges before resharpening is required.

Another object of the invention is to provide a machine of the character described which employs a pair of upper and lower feed belts or conveyors which act to move the rubber slabs between them towards the discharge or cutting station, the upper feed belt acting to floatingly accept slabs with snarled ends and creases and flatten them out as they approach the cutter station, there being means to adjust the pressure of the upper feed belt against the lower one.

Another object of the invention is to provide a machine of the character described employing means to drive the feed belts or conveyors so that the stroke thereof and hence the width of the rubber strip can be readily and easily adjusted.

Yet another object of the invention is to provide a rubber slab cutter which is adjustable to accept various sizes of rubber slabs as well as to cut various sizes of rubber strips therefrom, and which is efficient and economical in operation.

These and other objects of the invention will become more apparent as the following description proceeds in conjunction with the accompanying drawings, wherein:

FIG. 1 is a perspective view of the machine;

FIG. 2 is a top plan view with portions broken away to disclose details;

FIG. 3 is a side elevation taken from the right side of FIG. 1;

FIG. 4 is a front elevation of the stationary and rotary blade assembly per se at the first cutting stage;

FIG. 5 is a sectional view taken on the line 5—5 of FIG. 4;

FIG. 6 is a front elevation of the stationary and rotary blade assembly per se at the intermediate cutting stage;

FIG. 7 is a sectional view taken on the line 7—7 of FIG. 6;

FIG. 8 is a front elevation of the stationary and rotary blade assembly per se at the final cutting stage;

FIG. 9 is a sectional view taken on the line 9—9 of FIG. 8;

FIG. 10 is an enlarged detail view, partly in section, showing the cutting relationship between the rotary and stationary blades; and FIG. 11 is an enlarged detail view, partly in section, illustrating the adjustable means to effect intermittent feeding of slab to the cutting station.

Specific reference is now made to the drawings wherein similar reference characters are used for corresponding elements throughout.

The machine is generally indicated at 10 and includes side members 12 connected by transverse angle members 14 and a plate 16 at the top of side members to provide a sturdy frame for suporting the operative members. Mounted on one side member 12 adjacent the bottom end is a motor 16 which by suitable belts and sheaves 18 is operatively connected to reduction gearing 20 which is, in turn, operatively connected to a transversely extending drive shaft or spindle 22. The spindle which rotates up to 50 r.p.m. is journaled in anti-friction bearings 24 the pillow blocks of which are secured on the top ends of the side members 12 via bolts extending through slots, there being adjusting screws 26 acting on the pillow blocks to permit horizontal adjustment of the bearings.

Integral with or otherwise fixedly secured to the spindle 22 between the bearings is a substantially rectangular elongated block 28, see FIGS. 4–10, one longitudinal corner of which is milled to provide a non-rectangular recess 30. It will be seen from FIG. 10 that the horizontal wall 32 of the recess 30 is not parallel to but rather at an angle to the longitudinal sides 34 of the block. Similarly, the vertical wall 36 of the recess 30 is not parallel to but rather at an angle to the ends 38 of the block.

Removably secured in the recess 30 by recessed screws 40 is a blade 42 which is rectangular so that when either side face 44 thereof abuts the horizontal wall 32 of the recess and either end face 46 thereof abuts the vertical wall 36 of the recess, the position is such that the radius 48 from the center 50 of the spindle to a non-cutting edge 52 is shorter than the radius 54 from the center 50 to a cutting edge 56 for a purpose soon to appear.

Removably secured by recessed screws 58 to a transverse member 60 behind the rotary blade 42 is a rectangular blade 62 which is in a fixed position and presents a horizontal cutting edge 64 which coacts with the cutting edge 56 of the rotary blade 42 to shear the rubber slab. The two bearings 24 for the rotary blade spindle 22 are pre-adjusted so that one is about ½ inch higher than the other, as seen in FIGS. 4, 6 and 8. In addition, the rotary blade 42 is so mounted in the block 28 that its cutting edge 56 is also tilted vertically about ½ inch in the same direction. In other words, the total vertical tilt of the rotary blade cutting edge 56 is about an inch so that in the cutting operation, at the first stage the rotary edge 56 will contact the fixed edge 64 at one side of the machine as at 66, see FIG. 4, and as the rotary blade keeps turning the cutting edges contact intermediate their ends as at 68, see FIG. 6, and finally at their opposite ends as at 70, see FIG. 8. Because the turning radius 48 of the non-cutting edge 52 of the rotary blade is shorter than the turning radius 54 of the cutting edge 56, the non-cutting edge 52 will always clear the stationary cutting edge 64. Thus, no bevel on the cutting edges 56 and 64 is required. Moreover, the rotary blade 42 may be turned around or reversed and remounted on the block 28 whenever a new cutting edge is required since each longitudinal corner of the rectangular block 42 constitutes such a cutting edge.

Coming now to the means to feed the rubber slab to the cutting station, the spindle 22 extends through one of the bearings 24 and mounts a flywheel 72 at its end to supply stored energy to the spindle just as the cutting action is completed. Keyed to the spindle adjacent the flywheel is another wheel 74 having circumferentially spaced radial threaded bores 76, opening through its outer surface, see FIG. 11. Removably secured by recessed screws 78 are one or more segments or cams 80 for a purpose soon to appear.

Journaled in suitable pairs of spaced bearings 82 and 84 are shafts 86 and 88 which mount rollers 90 and 92 over which is entrained an endless belt or conveyor 94.

Secured on one end of the forward shaft 88 is a wheel 96. When the cam 80 engages the wheel 96, the shaft 88 is rotated for the length of time that contact is made between these members. When the cam 80 is out of engagement with the wheel 96, the rotary blade spindle 22 continues to rotate but the shaft 88 stops until its wheel 96 is reengaged by the cam 80 as it comes around. The length and number of removable segments or cams 80 mounted on the wheel 74 will determine the stroke of the feed conveyor 94 and hence the extent to which the rubber slab will extend beyond the stationary blade 62 to be sheared by the rotary blade 42.

The uncured rubber slab is frequently irregular in that it has snarled ends and creases. These may interfere with the cutting action. Therefore, a means is provided to flatten and smooth out the slab as it approaches the cutting station. This means is in the form of an upper conveyor 98 which is driven simultaneously with the lower conveyor 94 and coacts with the latter to apply pressure to the slab.

The upper conveyor comprises a front roller 100 and a rear roller 102 of larger diameter over which is entrained an endless belt 104. The lower flight 106 of the belt 104 is adjacent and parallel to the upper flight of the lower conveyor 94 while the upper flight 108 is at an angle thereto, as seen clearly in FIG. 1.

One end of the shaft 110 associated with the front roller 100 mounts a toothed gear 112 which meshes with a toothed gear 114 of the same diameter that is mounted on the corresponding end of the front lower conveyor shaft 88 so that the upper and lower conveyors are driven intermittently in unison. The rear roller 102 is driven from the front roller 100 by appropriate sprockets and an endless chain 116.

The front roller 100 is as close as possible to the stationary blade 62 because pressure must be positively exerted on the rubber slab to hold it properly in place for the shearing action. A means is provided to adjust the pressure of the front roller 100 of the upper conveyor and this consists of vertical bars 118 each of which is mounted for pivotal movement on and around the axis of the shaft 88 as at 120. The upper ends of the bars 118 journal the ends of the shaft 110 of the front upper conveyor roller 100 as at 122. A spring 124 is terminally secured to each bar 118 adjacent its lower end as at 126 and to each side member 12 as at 128. A lug 130 extends laterally from the side member 12 and threadedly receives an adjusting screw 132. The springs 124 urge the lower ends of the bars 118 against the screw 132. Thus, by shortening the distance between the ends of the screws 132 and the bars 118, the roller 100 is lowered towards the lower conveyor 94 to exert greater pressure on slabs passing therebetween, and vice versa.

A means is also provided to pre-smooth the slab as it is fed to the cutting station and this is accomplished by the action of the rear roller 102 pressing against the slab on the upper flight of the lower conveyor 94 and funneling the slab towards the cutting station. This is a floating action and is also adjustable. Thus, the bearings 134 for the rear roller 102 are carried by longitudinal bars 136 which are pivoted as at 138 at their front ends on the shaft 110. Screws 140 are threaded through the free ends of the bars 136 and bear against the upper edges of the side members 12, as seen in FIG. 1. Thus, the distance between the rear roller 102 and the upper flight of the lower conveyor 94 can be adjustably raised or lowered. In practice, it is advisable to adjust the rollers 100 and 102 above the lower conveyor to approximately the same height.

In operation, when one knows the approximate thickness of the uncured rubber slab and the desired width of each strip suitable for feeding an extruder, the proper number of segments or cams 80 are mounted on the wheel 74 for the desired conveyor stroke and the pressure of the upper conveyor rollers 100 and 102 are adjusted by the screws 132 and 140 relative to the thickness of the slab. The slab is then placed on the conveyor 94 and the motor 16 is energized so that the slab is funneled below the upper rear roller 102 and then squeezed below the upper front roller 100 until it overlaps the stationary blade 62 at which time the upper and lower conveyors stop and the rotary blade 42 comes around to shear off the rubber into a strip, and this action is intermittently continuous. The strips are discharged on an inclined chute 142 which can be positioned close to the feed box side of an extruder, or the cut strips can be made to drop directly on a slab table. When the cutting edge 56 of the rotary blade is worn, the set screws 40 are removed and the blade is reversed or inverted to position one of the other three remaining edges as a cutting edge opposite the edge 64 of the stationary blade 62. The same operation can be effected for the stationary blade 62 itself since it too has four longitudinal cutting edges at its corner.

While a preferred embodiment of the invention has here been shown and described, a skilled artisan may make minor variations without departing from the spirit of the invention and the scope of the appended claims.

I claim:

1. A rubber slab cutter comprising a frame, a slab conveyor mounted thereon, a first stationary blade mounted on said frame at the discharge end of said frame and including a vertical face terminating in an upper horizontal cutting edge, a second substantially rectangular blade having a vertical face terminating in a lower horizontally extending cutting edge and an upper horizontally extending edge, a spindle, means to rotate said spindle and means mounting said second blade on said spindle so that said lower cutting edge is at a vertical angle relative to and closely adjacent said horizontal cutting edge of said first blade and the radius from the axis of said spindle to said lower cutting edge of said second blade is greater than that to said upper cutting edge of said second blade so that slab extending beyond said first blade will be sheared into strips upon rotation of said spindle, said conveyor including a pair of rollers and an endless belt entrained thereover providing an upper slab conveying flight and means to move said upper flight intermittently towards said blades in adjustable strokes synchronously with rotation of said spindle.

2. The combination of claim 1 wherein said means mounting said second blade on said spindle includes a block fixed to said spindle, having a non-rectangular recess in one of its corners, and removable means securing said second blade in said recess with said upper and lower edges thereof extending beyond an end of said block so that said second blade may be reversed or inverted to selectively position each remaining horizontally extending edge in a cutting position when a cutting edge previously employed has been dulled.

3. The combination of claim 1 wherein said means to move said upper flight intermittently includes a first wheel connected to one of said rollers, a second wheel mounted on said spindle and segments removably and selectively mounted on said second wheel adapted to frictionally engage and rotate said first wheel, the stroke of said upper flight being proportional to the circumferential lengths of said segments.

4. The combination of claim 1 and means to adjust pressure on the slabs carried by said conveyor to smooth out creases and hold the slabs firmly at said first stationary blade during the shearing operation.

5. The combination of claim 4 wherein said means to adjust pressure on the slabs includes a second conveyor mounted above said first-named conveyor for passage of slabs therebetween and means to adjust the distance between said first and second conveyors.

6. The combination of claim 5 wherein said second conveyor includes a pair of spaced rollers and an endless belt trained thereover with one of said rollers positioned adjacent said stationary blade, said means to adjust the distance between said first and second conveyors including vertically extending bars pivoted intermediate their ends and further pivoted at their upper ends to the ends of said one roller, resilient means acting on said bars to urge their upper ends and said one roller downwardly towards said first conveyor and adjustable stops adapted to engage said bars and limit their pivotal movement.

7. A rubber slab cutter comprising a frame, a slab conveyor mounted thereon including spaced rollers and an endless belt entrained thereover, having an upper slab conveying flight, a stationary blade mounted on said frame adjacent one of said rollers, a spindle and means to rotate the same, a blade mounted on said spindle cooperating with stationary blade to cut slabs into strips, and adjustable means to advance said upper flight towards said stationary blade synchronously with the rotation of said spindle, said last-named means including a first wheel operatively connected to said one roller, a second wheel connected to said spindle and segments removably and selectively mounted on said second wheel adapted to frictionally engage and rotate said first wheel, the stroke of said upper flight being proportional to the circumferential lengths of said segments.

8. A rubber slab cutter comprising a frame, a slab conveyor mounted thereon including spaced rollers and an endless belt entrained thereover, having an upper slab conveying flight, a stationary blade mounted on said frame adjacent one of said rollers, a spindle and means to rotate the same, a blade mounted on said spindle cooperating with stationary blade to cut slabs into strips, adjustable means to advance said upper flight towards said stationary blade synchronously with the rotation of said spindle, and means to adjustably apply pressure on slabs on said upper flight to smooth out creases and holds the slabs firmly during the shearing operation, said adjustable pressure means including a further roller extending across said upper flight adjacent said one roller and means to adjust the height of said further roller above said upper flight.

9. The combination of claim 8 wherein said means to adjust the height of said further roller above said upper flight includes vertically extending bars pivoted intermediate their ends and journaling said further roller at their upper ends, resilient means urging said upper ends of said bars and said further roller downwardly towards said upper flight and adjustable stops adapted to engage said bars and limit their pivotal movement.

10. A rubber slab cutter comprising a frame, a slab conveyor mounted thereon, a stationary blade mounted on the frame at the discharge end thereof and including a vertical face terminating in an upper horizontal cutting edge, a rotary rectangular blade having a vertical face terminating in a lower horizontally extending cutting edge, a spindle mounting said rotary blade and including a rotating axis, said axis of said spindle being disposed at a vertical angle relative to said cutting edge of said stationary blade and said cutting edge of said rotary blade, said cutting edges of said stationary and rotary blades crossing centrally midway through the cut at which position said spindle axis passes through said intersection and is disposed equidistant from said cutting edges of said stationary and said rotary blades.

11. The combination of claim 10 wherein said rotary rectangular blade includes an upper horizontally extending edge and the radius from the axis of said spindle to said lower horizontal cutting edge of said rotary blade is greater than to said upper horizontal edge of said rotary blade so that slab extending beyond said stationary blade will be sheared into strips upon rotation of said spindle.

References Cited by the Examiner

UNITED STATES PATENTS

| | | | |
|---|---|---|---|
| 684,942 | 10/1901 | Mercer | 83—422 |
| 1,723,068 | 8/1929 | Parsons | 83—273 |
| 2,081,280 | 5/1937 | Pearl | 83—339 |
| 2,814,345 | 11/1957 | Pepper | 83—698 |
| 3,224,312 | 12/1965 | Larson | 83—355 |

WILLIAM W. DYER, JR., *Primary Examiner.*

JAMES M. MEISTER, *Examiner.*

L. TAYLOR, *Assistant Examiner.*